United States Patent
Kamen

(10) Patent No.: US 7,509,662 B2
(45) Date of Patent: Mar. 24, 2009

(54) METHOD AND APPARATUS FOR GENERATION OF A PREFERRED BROADCASTED PROGRAMS LIST

(75) Inventor: Yakov Kamen, Cupertino, CA (US)

(73) Assignee: JLB Ventures, LLC, Washington, DC (US)

(*) Notice: Subject to any disclaimer, the term of this patent is extended or adjusted under 35 U.S.C. 154(b) by 876 days.

(21) Appl. No.: 10/029,784

(22) Filed: Oct. 19, 2001

(65) Prior Publication Data
US 2002/0085090 A1 Jul. 4, 2002

Related U.S. Application Data

(60) Provisional application No. 60/241,880, filed on Oct. 19, 2000.

(51) Int. Cl.
G06F 3/00 (2006.01)
(52) U.S. Cl. .............................. 725/9; 725/39; 725/46; 725/47; 725/52
(58) Field of Classification Search ............... 725/39, 725/46, 47
See application file for complete search history.

(56) References Cited

U.S. PATENT DOCUMENTS

| | | | |
|---|---|---|---|
| 5,414,773 A | 5/1995 | Handelman | |
| 5,479,268 A | 12/1995 | Young et al. | |
| 5,532,754 A | 7/1996 | Young et al. | |
| 5,737,028 A | 4/1998 | Bertram et al. | |
| 5,751,282 A | 5/1998 | Girard et al. | |
| 5,801,747 A * | 9/1998 | Bedard | 725/46 |
| 5,818,441 A | 10/1998 | Throckmorton et al. | |
| 5,841,563 A | 11/1998 | Effenberger | |
| 5,900,915 A | 5/1999 | Morrison | |
| 5,926,168 A | 7/1999 | Fan | |
| 5,956,456 A | 9/1999 | Bang et al. | |
| 5,999,167 A | 12/1999 | Marsh et al. | |
| 6,029,195 A | 2/2000 | Herz | |
| 6,075,575 A | 6/2000 | Schein et al. | |
| 6,167,188 A | 12/2000 | Young et al. | |
| 6,205,485 B1 | 3/2001 | Kikinis | |
| 6,233,389 B1 | 5/2001 | Barton et al. | |
| 6,271,831 B1 | 8/2001 | Escobosa et al. | |
| 6,614,987 B1 * | 9/2003 | Ismail et al. | 386/83 |
| 6,721,953 B1 * | 4/2004 | Bates et al. | 725/39 |
| 2004/0049787 A1 * | 3/2004 | Maissel et al. | 725/46 |

FOREIGN PATENT DOCUMENTS

WO WO 00/01149 A1 1/2000

* cited by examiner

*Primary Examiner*—Vivek Srivastava
*Assistant Examiner*—Fred Peng
(74) *Attorney, Agent, or Firm*—Banner & Witcoff, Ltd.

(57) ABSTRACT

A second set of broadcasted programs is added to a first set of broadcasted programs. The second set of broadcasted programs includes broadcasted programs viewed by a viewer for a period of time at least equal to a first threshold. A third set of broadcasted programs is removed from the first set of broadcasted programs. The third set of broadcasted programs includes broadcasted programs not viewed by a viewer for a period of time at least equal to a second threshold. In one embodiment, a fourth set of broadcasted programs selected by the viewer is added to the first set of broadcasted programs. In one embodiment, the first threshold and the second threshold are updated upon the viewer indicating dissatisfaction. In one embodiment, the first threshold and the second threshold are updated upon the viewer returning to a schedule list more than a predetermined number of times. In one embodiment, the first threshold is set to be a first percentage of a period of time that a channel was viewed, and the second threshold is set to be a second percentage of the period of time that the channel was viewed.

20 Claims, 4 Drawing Sheets

METHOD AND APPARATUS FOR GENERATION OF A PREFERRED BROADCASTED PROGRAMS LIST

RELATED APPLICATIONS

The present application claims priority to the provisional filed application entitled Dynamic, Automatic Generation of Favorite Times and Channels List, filed on Oct. 19, 2000, Ser. No. 60/241,880.

FIELD OF THE INVENTION

The invention relates to the field of data processing. More specifically, the invention relates to processing data concerning television viewing preferences.

BACKGROUND OF THE INVENTION

Due to the enormous amount of TV channels available on digital cable, satellite TVs, etc., it has become a frustrating exercise for a viewer to try to scroll through all the channels at one time, because by the time a typical viewer may scroll through all the channels, a typical TV program may already be well under way, if not nearly over! Thus the viewer may be stuck in a continuous loop of flipping through channels, without being able to locate his preferred shows in time to view them.

To assist the viewer, some TV service providers (e.g., cable, satellite, etc.) offer a "favorites" function that allows the user to create his own short list of preferred channels and scroll only through those channels, instead of scrolling through all the channels. However, the given names of channels are usually replaced by numbers or a four-letter standard abbreviation, so the user simply does not recognize many channels and does not know whether he would prefer them or not. Any time the user wants to add or delete a channel, he manually updates the list.

Additionally, some users watch TV only during certain preferred time periods, and find it inconvenient to scroll through broadcast program listings for time periods when they do not watch TV.

As a result, preferred broadcast programs lists require programming, maintenance, updating, and so forth, which can be inconvenient. Due to this potential inconvenience, users may give up on the effort to create their own preferred broadcast programs list.

SUMMARY OF THE INVENTION

A second set of broadcasted programs is added to a first set of broadcasted programs. The second set of broadcasted programs includes broadcasted programs viewed by a viewer for a period of time at least equal to a first threshold. A third set of broadcasted programs is removed from the first set of broadcasted programs. The third set of broadcasted programs includes broadcasted programs not viewed by a viewer for a period of time at least equal to a second threshold. In one embodiment, a fourth set of broadcasted programs selected by the viewer is added to the first set of broadcasted programs. In one embodiment, the first threshold and the second threshold are updated upon the viewer indicating dissatisfaction. In one embodiment, the first threshold and the second threshold are updated upon the viewer returning to a schedule list more than a predetermined number of times. In one embodiment, the first threshold is set to be a first percentage of a period of time that a channel was viewed, and the second threshold is set to be a second percentage of the period of time that the channel was viewed.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In one embodiment, creating and dynamically updating a list of a viewer's preferred broadcasted programs, with associated channels and viewing times, is accomplished through statistical analysis of the viewer's behavior to learn the viewer's preferences from accumulated statistics. The viewer is thus not required to program each broadcasted program into the list. Channels include, in one embodiment, channels selectable on a television set. On each channel a set of broadcasted programs may be viewed. A broadcasted program is associated with a viewing time; the time during which the program is broadcast. In one embodiment, creating and dynamically updating a list of preferred broadcasted programs for the viewer without requiring the viewer to program the list is accomplished by using adaptive heuristic algorithms, commonly known as "fuzzy logic," to learn the viewer's preferences from accumulated statistics.

Figure 1:
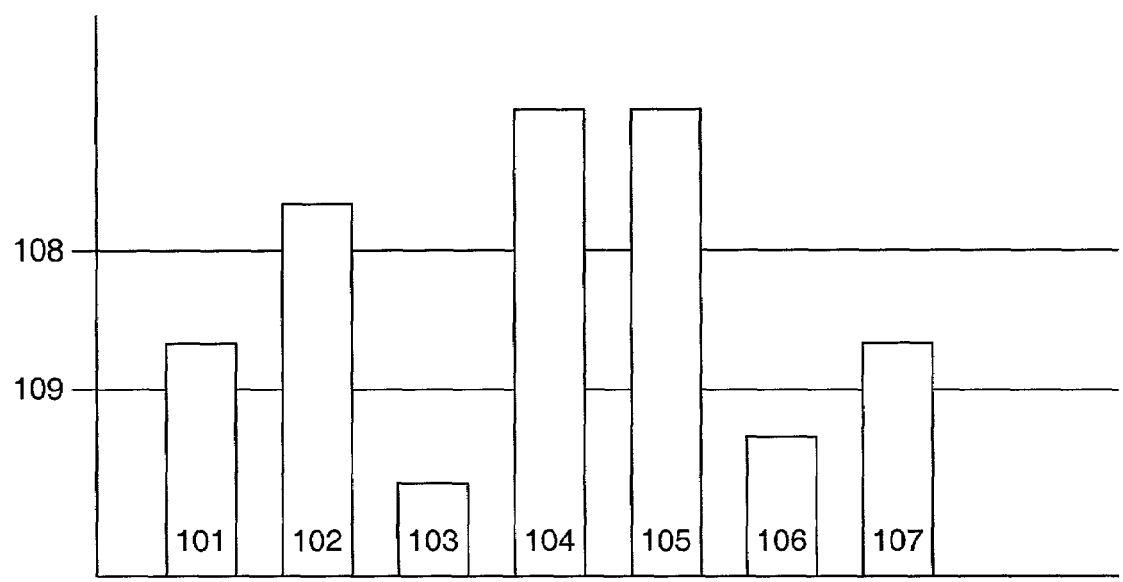
FIG. 1 illustrates a histogram of a number of visits to channels according to one embodiment.

Generating a preferred broadcasted programs list according to one embodiment proceeds, for example, as follows. FIG. 1 is a histogram of a number of visits to channels according to one embodiment. It shows a histogram of a number of channels 101 through 107, on the X axis, and the number of visits to channels on the Y axis, where numeric thresholds, in this example L1 (108) and L2 (109), can be inserted or applied either by the system or by the user. In one embodiment, the histogram contains information on how long each channel is viewed. The numeric thresholds in one embodiment are selected by a media provider such as a cable television provider. In one embodiment, a histogram includes not only channels, but also times of day per each channel. L1 (108) and L2 (109) may be, for example, a couple of predetermined values or they may be fixed ratios of the highest peak of the histogram; e.g., 80 percent and 30 percent of the highest peak of the histogram. In one embodiment, the highest peak of the histogram will represent the viewing length of time of a channel viewed more than any other channel. In one embodiment, the user may select these ratios. Accordingly, a preferred broadcasted programs list could be generated in which broadcasted programs that are visited often (i.e., visited more times or for a greater length of time than a predetermined threshold value) appear in the list, whereas broadcast programs that are visited less often (i.e., visited fewer times or for a lesser length of time than a predetermined threshold value) do not appear in the list. Using the histogram shown in FIG. 1 as an example, only broadcast programs on channels 102, 104, and 105 would be added to the preferred list because these are the only channels with some criteria (e.g., number of times selected, length of time viewed, etc.) at least equal to the upper threshold level L1 (108). Broadcasted programs on these channels would in one embodiment be added to a preferred broadcasted programs list. If channels 103 and 106 were already in the preferred list, then they would be removed because they possessed some criteria (e.g., number of times selected, length of time viewed, etc.) not at least equal to the lower threshold level L2 (109). Broadcasted programs on these channels would in one embodiment be removed from a preferred broadcasted programs list. Those channels possessing criteria measured between the upper threshold level L1 and the lower threshold level L2, such as channels 101 and 107, would not be added to the preferred list (and therefore neither would any broadcasted programs on those channels), but they would not be removed from the preferred list if they were already present on the preferred list. The thresholds discussed above may be employed to include and exclude broadcasted programs as well as channels. It can be seen that by using the two thresholds, a margin of consistency is maintained between the two thresholds so that the content of the preferred list does not fluctuate too much. If the content of the preferred list did fluctuate too much, then viewers might be disinclined to refer to the preferred list.

Figure 2:
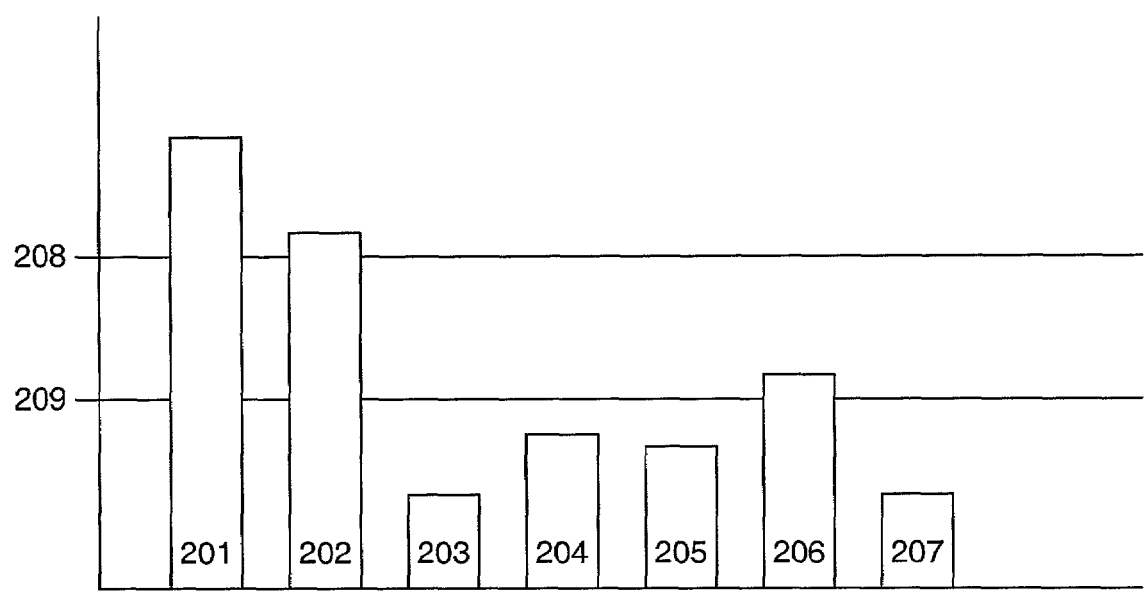
FIG. 2 illustrates a histogram that uses an alternative set of statistics according to one embodiment.

FIG. 2 is a histogram that uses an alternative set of statistics according to one embodiment. Rather than creating a histogram that uses the total number of visits to channels as a criteria, a histogram is created that reflects, for example, the time spent on a channel per week, per day, etc. Such a histogram may yield a different preferred broadcasted programs or channels and viewing times list and may also use multiple thresholds, allowing the user to select a positive or negative exclusion. In one embodiment, the upper threshold 208 represents a minimum amount of time spent viewing a broadcasted program that will cause that program to be included in the most preferred broadcasted programs list, and the lower threshold 209 represents a minimum amount of time spent viewing a broadcasted program that will prevent that program from being excluded from the preferred broadcasted programs list.

Figure 3:
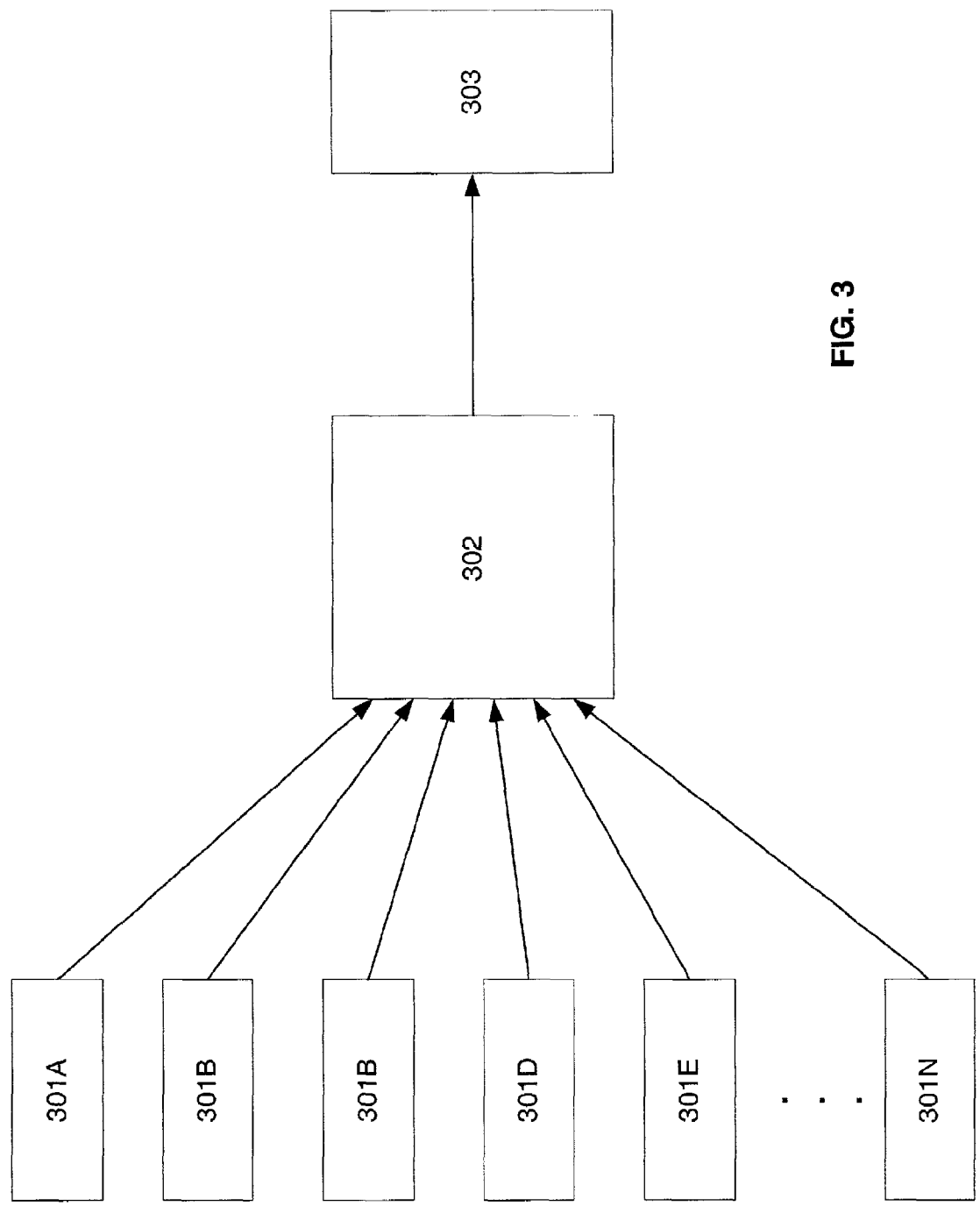
FIG. 3 illustrates an alternative technique of generating a preferred broadcasted programs list according to one embodiment.

FIG. 3 is a data flow diagram showing an alternative technique of generating a preferred broadcasted programs list according to one embodiment. Rather than relying on one or another statistic arbitrarily, a whole set of statistics, 301A through 301N, may be employed in one embodiment to feed into a fuzzy logic software engine 302 that can learn based on user behavior. Statistic 301A, for example, is the number of visits, as used in FIG. 1. Statistic 301B is the total viewing time per channel or total viewing time per broadcasted program, as used in FIG. 2. Statistic 301C in this example is the average duration of visits per channel of the average duration of visits per broadcasted program. Statistic 301D is the minimal duration of visits to a channel or broadcasted program. Statistic 301E is the maximum duration of visits to a channel or broadcasted program. Statistic 301N could include any other statistics used to determine viewer behavior when flipping through channels, viewing programs, etc. All these values are continually fed into fuzzy logic software engine 302, which, based on its learning and certain preprogrammed base rules, then dynamically generates a fuzzy logic preferred broadcasted programs list 303.

The advantage of such a preferred broadcasted programs list generated dynamically by a fuzzy logic software engine is that if the user changes his viewing practices and starts viewing new channels or new broadcasted programs for any substantial duration, the fuzzy logic engine will accordingly adapt very quickly. The reasons for this are well known in the art of fuzzy logic programming.

Figure 4:
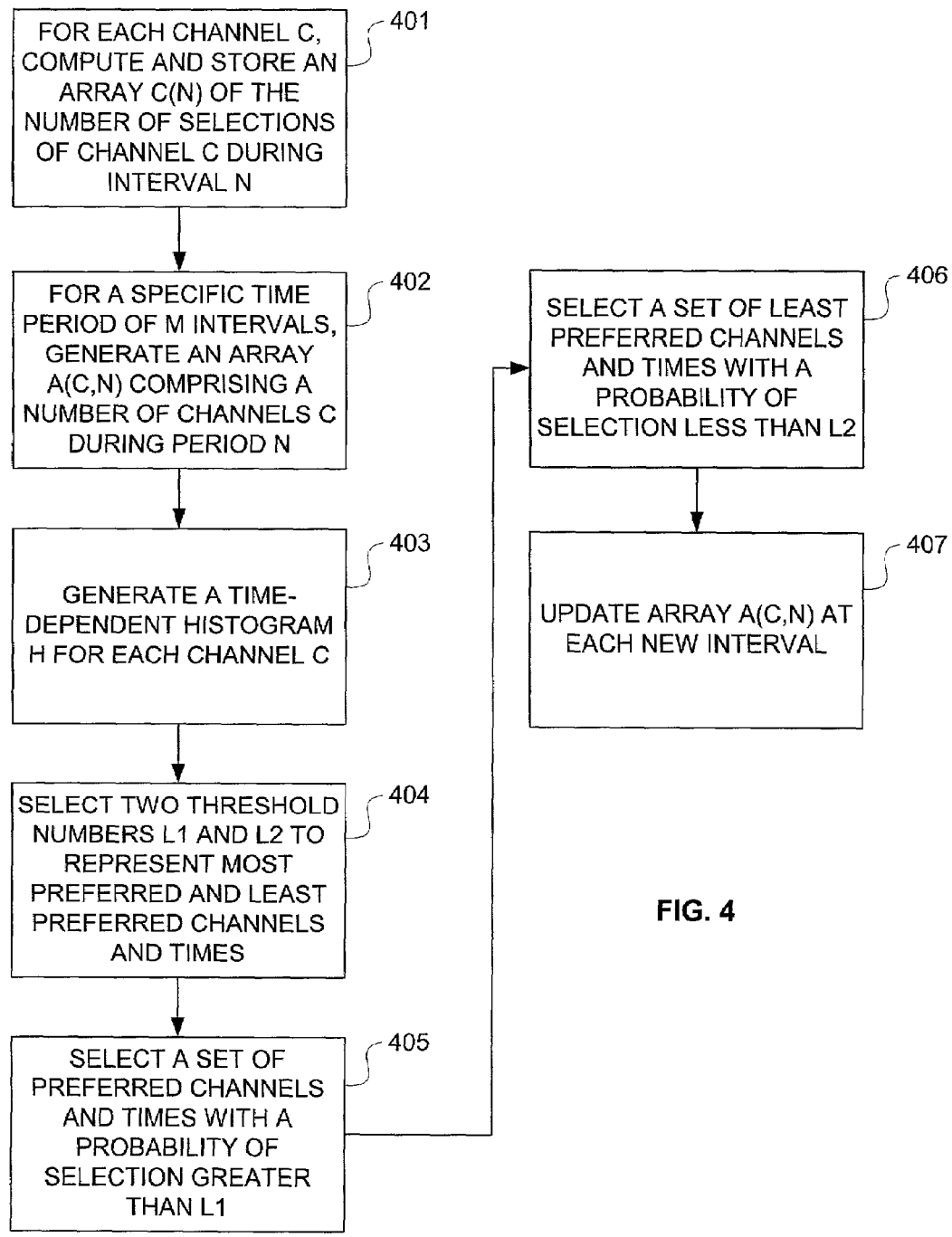
FIG. 4 illustrates a technique for creating and dynamically updating a list of preferred channels and viewing times for a viewer without requiring the viewer to program the list according to one embodiment.

FIG. 4 is a flow diagram showing a technique for creating and dynamically updating a list of preferred channels and viewing times for a viewer without requiring the viewer to program the list according to one embodiment. In process block 401, for each channel C, a system computes and stores an array c(N), where N is a number of elementary intervals (Dt) of data gathering and c(N) is the number of selections of the channel C during the time period Dt. The typical range of Dt according to a preferred embodiment is between one day (24 hours) and one week (168 hours), in small increments, e.g., half-hour steps. In process block 402, for a specific time period of M elementary intervals (e.g., 30, 60, or 90 days), an array A(C,N) is generated, where A(C,N) comprises a certain number of channels C selected from the listing of all channels during the time period N from its starting moment. In process block 403, a time-dependent histogram H is generated for each channel C. In process block 404, two threshold numbers L1 and L2 are selected to determine most preferred and least preferred channels and viewing times, or in other words, broadcasted programs. Threshold numbers L1 and L2 may initially be arbitrarily selected, and in one embodiment are initially selected by a media provider, such as a cable television provider. In one embodiment, threshold numbers L1 and L2 may be modified by a user, such as a user of a television set. In process block 405, based on threshold L1, an algorithm selects a set of preferred channels and times, or in other words, broadcasted programs, with a probability of selection by the viewer greater than L1. The probability may be determined by various factors. In one embodiment, the probability is a forecast of future selections of a broadcast program or channel based on past selections of the broadcast program or channel. In one embodiment, a probability is determined for each time of day. In one embodiment, a probability is determined for each time of each day of the week. In process block 406, based on threshold L2, an algorithm chooses a set of least preferred channels and times, or in other words, broadcast programs, with a probability of selection smaller than L2. In process block 407, array A(C, N) is updated at each new Dt interval, creating a moving aperture of computation. The array is updated to reflect changes in selections by the user over time. In one embodiment, the user can also add channels into the preferred list manually. The user can manually add broadcasted programs into the preferred list. Each broadcasted program is associated with a channel and viewing time.

In one embodiment, threshold parameters can be updated according to a user's indication of satisfaction or dissatisfaction with the list of preferred broadcast programs. In one embodiment, the indication of satisfaction or dissatisfaction is expressed as a rating on a scale (e.g., 7 out of 10 being an indication of moderate satisfaction and 3 out of 10 being an indication of moderate dissatisfaction). In one embodiment, the indication of satisfaction or dissatisfaction is expressed as a boolean true or false value, where a user expresses either entire satisfaction (e.g., as by a "thumbs up" or "true" selection) or entire dissatisfaction (e.g., as by a "thumbs down" or "false" selection). Where a user expresses satisfaction with the list of preferred broadcast programs, the threshold parameters remain unchanged. Where a user expresses dissatisfaction, the threshold parameters are modified so that either a greater or lesser number of broadcast programs are included in the preferred list. If the number of broadcast programs in the list is already large, the threshold parameters L1 and L2 may be raised so that the number of broadcast programs in the preferred list is reduced. If the number of broadcast programs in the list is small, the threshold parameters L1 and L2 may be lowered so that the number of broadcast programs in the preferred list is increased. In one embodiment, an indication of dissatisfaction is sent to a media provider, who may then manually modify the threshold parameters. In one embodiment, threshold parameters can be updated depending a number of times the user returns to the complete schedule list for more information during the control period. If the user returns to the complete list more than a predetermined number of times then L1 or L2 may be too high. In an opposite case, the threshold levels may be set too low and the user-generated preferred list may be too long. In one embodiment, if a threshold (L1 or L2) is set too high, as evidenced by a viewer returning to a schedule list more than a predetermined number of times (where the predetermined number may be selected by a viewer in one embodiment, or by a media provider in one embodiment), then that threshold is automatically lowered. Similarly, in one embodiment, if a threshold is set too low, then that threshold is automatically raised. Thus, the viewer is not required to select each broadcasted program, channel, or viewing time to include or exclude from the list, as these are included or excluded by the thresholds, and the thresholds are automatically adjusted.

In addition to generating a list of most preferred broadcast programs, one embodiment also removes broadcasted programs having viewing times during time intervals that are not of interest to the viewer from the list of preferred broadcasted programs. A time interval is determined to not be of interest to a viewer if the user does not select programs which are broadcast on any channels during the time interval. For example, if the user does not select the time interval between 10 a.m. and noon during working days (which could simply mean that he is working at this time) and the user is not doing a recording from the guide, it may be more convenient for the user to scroll through only the time intervals of interest. Therefore, in one embodiment, the time frame for the whole day is divided by contiguous intervals. An interval may vary in duration, but in a preferred embodiment typically lasts 2-3 hours. A histogram of activity is then generated, and based on threshold numbers T1 and T2, the system automatically creates a most preferred time frames list and least preferred time frames list. The threshold numbers T1 and T2 may be chosen in the same manner as the threshold numbers L1 and L2. However, the threshold numbers T1 and T2 are in one embodiment chosen for each time interval. Therefore, selection criteria for one time of day may differ from selection criteria for another time of day as the corresponding threshold numbers for these times differ. These may also differ depending on the day of the week.

In one embodiment, the above processes may be performed by a system. In one embodiment, the system includes a first unit to add to a first set of broadcasted programs a second set of broadcasted programs. The second set of broadcasted programs includes broadcasted programs viewed by a viewer for a period of time at least equal to a first threshold. In one embodiment, the system also includes a second unit coupled with the first unit to remove from the first set of broadcasted programs a third set of broadcasted programs. The third set of broadcasted programs includes broadcasted programs not viewed by a viewer for a period of time at least equal to a second threshold. In one embodiment, the first unit is further to add to the first set of broadcasted programs a fourth set of broadcasted programs selected by the viewer. In one embodiment, the first unit is further to update the first threshold and the second threshold upon the viewer indicating dissatisfaction. In one embodiment, the first unit is further to update the first threshold and the second threshold upon the viewer returning to a schedule list more than a predetermined number of times. In one embodiment, the first unit is further to set the first threshold to be a first percentage of a period of time that a channel was viewed, and to set the second threshold to be a second percentage of the period of time that the channel was viewed. In one embodiment, the first unit is further to add to the first set of broadcasted programs a fifth set of broadcasted programs, the fifth set of broadcasted programs including broadcasted programs selected by a viewer a number of times at least equal to a third threshold, and wherein the second unit is further to remove from the first set of broadcasted programs a sixth set of broadcasted programs, the sixth set of broadcasted programs including broadcasted programs not selected by a viewer a number of times at least equal to a fourth threshold. In one embodiment, all of the above units are included within a processor. In one embodiment, all of the above units are included within a television set-top box. In one embodiment, all of the above units are included within a television.

The embodiments described above can be implemented using software in a TV viewing system. Such a TV viewing system can be implemented in many ways. A typical approach to implementation uses a set-top box that contains, among other things, a CPU, storage (e.g., RAM, ROM, etc.), a receiving network adapter, and circuitry to drive a viewing system such as a TV, monitor, projector, etc. All of these elements are not necessarily shown, but are well know in the art. For purposes of the embodiments described above, any other grouping, such as a TV with a built-in CPU, or a personal computer with TV capabilities are considered to be equivalent.

The method and apparatus disclosed herein may be integrated into advanced Internet- or network-based knowledge systems as related to information retrieval, information extraction, and question and answer systems. The system has a processor coupled to a bus. Also coupled to the bus are a memory which may contain instructions. Additional components coupled to the bus are a storage device (such as a hard drive, floppy drive, CD-ROM, DVD-ROM, etc.), an input device (such as a keyboard, mouse, light pen, bar code reader, scanner, microphone, joystick, etc.), and an output device (such as a printer, monitor, speakers, etc.). Of course, an exemplary computer system could have more components than these or a subset of the components listed.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EE- PROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:

adding to a first set of preferred broadcasted programs a second set of broadcasted programs, wherein each of the second set of broadcasted programs has an associated viewing value greater than or equal to a first viewing threshold;

removing from the first set of preferred broadcasted programs a third set of broadcasted programs, wherein each of the third set of broadcasted programs has an associated viewing value less than or equal to a second viewing threshold, wherein the second viewing threshold is less than the first viewing threshold;

displaying the first set of preferred broadcasted programs on a display device;

receiving an indication of a level of user satisfaction with the displayed first set of preferred broadcast programs; and updating at least one of the first viewing threshold and the second viewing threshold automatically based on the received indication of the level of user satisfaction with the displayed first set of preferred broadcast programs.

2. The method of claim 1, further comprising adding to the first set of preferred broadcasted programs a fourth set of broadcasted programs manually selected by a viewer.

3. The method of claim 1, wherein receiving the indication of the level of user satisfaction comprises determining that a viewer returned to a complete schedule of programs more than a predetermined number of times.

4. The method of claim 1, wherein the first threshold and the second threshold are calculated as different percentages of a maximum time that a channel was viewed.

5. The method of claim 1, wherein the indication corresponds to a level of user dissatisfaction and wherein the updating comprises:

determining that the number of broadcast programs in the first set exceeds a program number threshold;

raising at least one of the first threshold and the second threshold; and determining that the raising will decrease the number of broadcast programs in the first set to below the program number threshold.

6. The method of claim 1, wherein the indication corresponds to a level of user dissatisfaction and wherein the updating comprises:

determining that the number of broadcast programs in the first set is lower than a program number threshold;

lowering at least one of the first threshold and the second threshold; and determining that the lowering will increase the number of broadcast programs in the first set to more than the program number threshold.

7. The method of claim 1, wherein the first viewing threshold and the second viewing threshold correspond to either a number of times a broadcast program was tuned to or an accumulated viewing time for a broadcast program.

8. The method of claim 1, wherein the received indication of the level of user satisfaction is based on a boolean user input corresponding to satisfaction with the displayed first set of preferred broadcast programs.

9. The method of claim 1, further comprising:

calculating and storing a number of times that a user returned to a complete schedule of programs;

comparing the number of times that the user returned to the complete schedule of programs to a first predetermined value;

lowering at least one of the first viewing threshold or the second viewing threshold only if the number of times that the user returned to the complete schedule of programs is greater than the first predetermined value;

comparing the number of times that the user returned to the complete schedule of programs to a second predetermined value; and raising at least one of the first viewing threshold or the second viewing threshold only if the number of times that the user returned to the complete schedule of programs is less than the first predetermined value.

10. A machine-readable medium that provides instructions that, when executed by a machine, cause the machine to perform operations comprising: adding to a first set of preferred broadcasted programs a second set of broadcasted programs, wherein each of the second set of broadcasted programs has an associated viewing value greater than or equal to a first viewing threshold;

removing from the first set of preferred broadcasted programs a third set of broadcasted programs, wherein each of the third set of broadcasted programs has an associated viewing value less than or equal to a second viewing threshold, wherein the second viewing threshold is less than the first viewing threshold;

displaying the first set of preferred broadcasted programs on a display device;

receiving an indication of a level of user satisfaction with the displayed first set of preferred broadcast programs; and updating at least one of the first viewing threshold and the second viewing threshold automatically based on the received indication of the level of user satisfaction with the displayed first set of preferred broadcast programs.

11. The machine-readable medium of claim 10, wherein the operations further comprise adding to the first set of preferred broadcasted programs a fourth set of broadcasted programs manually selected by a viewer.

12. The machine-readable medium of claim 10, wherein the indication corresponds to a level of user dissatisfaction, and wherein the updating comprises determining new values for at least one of the first threshold and the second threshold such that the new values will change the number of broadcast programs in the first set to correspond to a preferred range for the number of broadcast programs to display.

13. The machine-readable medium of claim 10, wherein receiving the indication of the level of user satisfaction comprises determining that a viewer returned to a complete schedule of programs more than a predetermined number of times.

14. The machine-readable medium of claim 10, wherein the first threshold and the second threshold are calculated as different percentages of a maximum time that a channel was viewed.

15. An apparatus comprising:

a processor configured to control at least some operations of the apparatus;

a memory storing computer executable instructions that, when executed by the processor, cause the apparatus to:

add to a first set of preferred broadcasted programs a second set of broadcasted programs, wherein each of the second set of broadcasted programs has an associated viewing value greater than or equal to a first viewing threshold;

remove from the first set of preferred broadcasted programs a third set of broadcasted programs, wherein each of the third set of broadcasted programs has an associated viewing value less than or equal to a second viewing threshold, wherein the second viewing threshold is less than the first viewing threshold;

display the first set of preferred broadcasted programs on a display device connected to the apparatus;

receive, via a user input device connected to the apparatus, an indication of a level of user satisfaction with the displayed first set of preferred broadcast programs; and update at least one of the first viewing threshold and the second viewing threshold automatically based on the received indication of the level of user satisfaction with the displayed first set of preferred broadcast programs.

16. The apparatus of claim 15, wherein the indication corresponds to a level of user dissatisfaction, and wherein the updating comprises determining new values for at least one of the first threshold and the second threshold such that the new values will change the number of broadcast programs in the first set to correspond to a preferred range for the number of broadcast programs to display.

17. The apparatus of claim 15, wherein receiving the indication of the level of user satisfaction comprises determining that a viewer returned to a complete schedule of programs more than a predetermined number of times.

18. The apparatus of claim 15, wherein the first threshold and the second threshold are calculated as different percentages of a maximum time that a channel was viewed.

19. The apparatus of claim 15, wherein the indication corresponds to a level of user dissatisfaction and wherein the updating comprises:

determining that the number of broadcast programs in the first set exceeds a program number threshold;

raising at least one of the first threshold and the second threshold; and determining that the raising will decrease the number of broadcast programs in the first set to below the program number threshold.

20. The apparatus of claim 15, wherein the indication corresponds to a level of user dissatisfaction and wherein the updating comprises:

determining that the number of broadcast programs in the first set is lower than a program number threshold;

lowering at least one of the first threshold and the second threshold; and determining that the lowering will increase the number of broadcast programs in the first set to more than the program number threshold.

* * * * *